United States Patent
Brookes et al.

(10) Patent No.: US 7,957,865 B2
(45) Date of Patent: Jun. 7, 2011

(54) VEHICLE SUSPENSION SYSTEM AND METHOD OF OPERATING SAME

(75) Inventors: Graham R Brookes, Carmel, IN (US); Joseph A Bounds, Fishers, IN (US); Gregory A Holbrook, Zionsville, IN (US)

(73) Assignee: Driveright Holdings, Ltd., Dublin (IE)

( * ) Notice: Subject to any disclaimer, the term of this patent is extended or adjusted under 35 U.S.C. 154(b) by 677 days.

(21) Appl. No.: 12/046,955

(22) Filed: Mar. 12, 2008

(65) Prior Publication Data

US 2008/0228352 A1   Sep. 18, 2008

Related U.S. Application Data

(60) Provisional application No. 60/906,368, filed on Mar. 12, 2007.

(51) Int. Cl.
*G06F 7/00* (2006.01)
*B60G 17/04* (2006.01)
*B60G 17/15* (2006.01)
*B60G 21/05* (2006.01)

(52) U.S. Cl. ...... 701/37; 701/36; 280/5.514; 280/5.519; 280/124.128

(58) Field of Classification Search ............ 701/37; 280/5.515, 5.514, 124.128
See application file for complete search history.

(56) References Cited

U.S. PATENT DOCUMENTS

| | | | |
|---|---|---|---|
| 5,013,067 A | | 5/1991 | Mine et al. |
| 6,168,171 B1 | | 1/2001 | Shono et al. |
| 6,276,710 B1 | | 8/2001 | Sutton |
| 6,959,932 B2 | * | 11/2005 | Svartz et al. ............... 280/5.514 |
| 6,993,422 B2 | * | 1/2006 | De Mersseman et al. ...... 701/37 |
| 7,119,672 B2 | * | 10/2006 | Subbaraman ................ 340/465 |
| 7,136,730 B2 | * | 11/2006 | Lu et al. ....................... 701/36 |
| 7,178,817 B1 | * | 2/2007 | Welles et al. .......... 280/124.128 |
| 7,267,331 B2 | * | 9/2007 | Holbrook et al. .......... 267/64.28 |

(Continued)

FOREIGN PATENT DOCUMENTS

EP      0 916 529 A     5/1999

(Continued)

OTHER PUBLICATIONS

Schonfeld, et al., "Electronically Controlled Air Suspension (ECAS) for Commercial Vehicles," Commercial Vehicle Suspensions, Steering Systems, and Traction, Society of Automotive Engineers, Inc., Jan. 1, 1991, pp. 15-24.

*Primary Examiner* — Khoi Tran
*Assistant Examiner* — Ian Jen
(74) *Attorney, Agent, or Firm* — Fay Sharpe LLP (57) ABSTRACT

A suspension system for use on a vehicle having two or more rear axles. The suspension system includes a plurality of gas springs and plurality of height sensors capable of outputting signals having a relation to distances between the respective ends of the respective first and second rear axles and the sprung mass of the vehicle. A control system adapted to selectively inflate or deflate respective ones of the plurality of gas springs to thereby adjust a leveled orientation of the sprung mass. The control system includes a controller that is adapted to determine a rear axle vertical offset and a rear axle articulation offset. The controller is adapted to determine whether conditions are appropriate for adjusting the suspension system by comparing the rear axle vertical offset and/or the rear axle articulation offset to a corresponding vertical offset threshold and/or an articulation offset threshold. A method is also included.

20 Claims, 7 Drawing Sheets

U.S. PATENT DOCUMENTS

| | | | |
|---|---|---|---|
| 7,380,800 B2 * | 6/2008 | Klees | 280/5.519 |
| 7,815,200 B2 * | 10/2010 | Bakshi | 280/6.153 |
| 2001/0018629 A1 * | 8/2001 | Heyring et al. | 701/37 |
| 2002/0032508 A1 * | 3/2002 | Uchino et al. | 701/37 |
| 2002/0138186 A1 * | 9/2002 | Kim | 701/37 |
| 2003/0189300 A1 * | 10/2003 | Burdock | 280/5.515 |
| 2003/0236603 A1 * | 12/2003 | Lu | 701/37 |
| 2004/0113377 A1 * | 6/2004 | Klees | 280/5.514 |
| 2004/0260442 A1 * | 12/2004 | Holbrook et al. | 701/37 |
| 2005/0010343 A1 * | 1/2005 | Misawa | 701/37 |
| 2005/0010344 A1 * | 1/2005 | Misawa | 701/37 |
| 2005/0077691 A1 * | 4/2005 | Witters | 280/5.514 |
| 2005/0080530 A1 * | 4/2005 | Arduc et al. | 701/37 |
| 2005/0110229 A1 * | 5/2005 | Kimura et al. | 280/5.514 |
| 2005/0212225 A1 * | 9/2005 | Suzuki et al. | 280/5.514 |
| 2006/0064213 A1 * | 3/2006 | Lu et al. | 701/37 |
| 2006/0284387 A1 * | 12/2006 | Klees | 280/5.519 |

FOREIGN PATENT DOCUMENTS

| | | |
|---|---|---|
| EP | 1 101 637 A | 5/2001 |
| EP | 1 884 380 A | 2/2008 |
| WO | WO 89/09703 A | 10/1989 |
| WO | WO 2005/123427 A | 12/2005 |
| WO | WO 2005/123427 A1 | 12/2005 |
| WO | WO 2006/135326 A | 12/2006 |

* cited by examiner

VEHICLE SUSPENSION SYSTEM AND METHOD OF OPERATING SAME

This application claims priority from U.S. Provisional Patent Application No. 60/906,368 filed on Mar. 12, 2007, the entire disclosure of which is hereby incorporated by reference herein. Additionally, the entire disclosure of U.S. patent application Ser. No. 11/705,916 filed on Feb. 13, 2007, which is entitled VEHICLE SUSPENSION SYSTEM AND METHOD, is also hereby incorporated herein by reference.

BACKGROUND

The subject matter of the present disclosure broadly relates to the art of vehicle suspension systems and, more particularly, to a suspension system and method of operating the same for a vehicle having two or more rear axles. Such a system and method being capable of at least adjusting a height and/or orientation of the vehicle based at least in part on the relative position and/or orientation of the two or more rear axles with respect to one another and, optionally, with respect to the front axle of the vehicle.

The subject matter of the present disclosure finds particular application and use in conjunction with suspension systems of wheeled vehicles, and will be described herein with specific reference thereto. However, it is to be appreciated that the subject matter of the present disclosure is also amenable to use in other applications and environments, and that the specific uses shown and described herein are merely exemplary.

Specific reference is made herein to the term "axle," which is used in conjunction with the present description and is to be broadly interpreted to generally denote any portion or portions of a vehicle that are operative to support an associated sprung mass between two or more ground-engaging components (e.g., wheels) of the vehicle. For example, an "axle" could be interpreted to be a rigid housing including one or more drive shafts and an optional differential or gear assembly. Such a construction is commonly used, for example, on a conventional cargo or utility truck. In this case, such an "axle" could be primarily responsible for transferring the load of the sprung mass from a set of springs to the ground-engaging components. In addition, such an axle could be adapted to transmit an engine torque to one or more of the ground-engaging components for propelling the vehicle.

An "axle" could also include the equivalent structures of the previous example but for an independent-type suspension system. As is commonly known in the art, the ground-engaging components of a vehicle having an independent suspension are capable of being vertically displaced independently from one another. An example of an independent suspension is that which is commonly used in the front and/or rear portions of a passenger-type vehicle. These independent suspension systems typically include upper and lower support arms and a wheel hub bearing assembly for transferring the vehicle mass to the associated wheels. Optionally, the wheel hub may include a universal or a constant velocity (CV) joint for receiving a drive shaft from a gearbox, transaxle, transfer case, or other powertrain component for propelling the vehicle. Even though the left front wheel, for example, may not be rigidly associated with the right front wheel of the passenger vehicle, an imaginary "axle" or "axis" can be defined between them. In such a case, the imaginary "axle" would extend from the point of rotation of the left wheel (i.e., proximal to a left wheel or hub bearing) to the point of rotation of the right wheel (i.e., proximal to a right wheel or hub bearing). During vehicle operation, the displacement of the imaginary "axle" would therefore be similar to that of the rigid-housing-type axle described previously. For these reasons, the use of the term "axle" is not intended to be limited to powertrain or driveline components or to limit the application of the instant invention to specific suspension system designs.

Additionally, specific reference is made herein to the terms "front axle" and "rear axle(s)" of a vehicle. For purposes of this disclosure, the front-most axle of a vehicle, which will commonly be a steering axle, is considered to be the "front axle." Thus, any one or more axles that are rearward of the front-most axle are considered to be "rear axles".

It is well known that land vehicles of most types and kinds are outfitted with a suspension system that supports a sprung mass of the vehicle (e.g., a body or chassis) on an unsprung mass of the vehicle (e.g., an axle or other wheel-engaging member). Known suspension systems typically include a plurality of spring elements (e.g., coil springs, leaf springs, torsion springs) that are responsive to forces and/or loads acting on the sprung and/or unsprung masses of the vehicle. Additionally, known suspension systems commonly include a plurality of damping members for dissipating energy inputs, such as the forces and/or loads acting on the sprung and/or unsprung masses of the vehicle.

In an effort to improve performance and/or ride quality of vehicles, suspension systems have been developed that utilize gas spring assemblies that are operative to adjust the height and/or orientation of the sprung mass with respect to the unsprung mass. As one example, such a known suspension system can include a set of front axle height sensors and a set of rear axle height sensors. The suspension system is adapted to monitor these height sensors while the vehicle is being operated. Generally, when a substantial difference is detected between the front and rear axles, the suspension system will selectively inflate or deflate one or more of the gas springs to adjust the sprung mass of the vehicle into the desired position and/or orientation. Doing so will often advantageously allow for a more even load distribution of the sprung mass over the unsprung mass.

However, such prior art suspension systems can also introduce certain problems and/or disadvantages that can be associated with or otherwise related to the actions of adjusting the position and/or orientation of the sprung mass relative to the unsprung mass of the vehicle. One such disadvantage is that prior art suspension systems are known to undertake height adjustment and/or leveling activities under conditions of operation in which it may be less desirable to do so, such as conditions in which the vehicle is undergoing a temporary or otherwise short term variation in height, for example.

Figure 1:
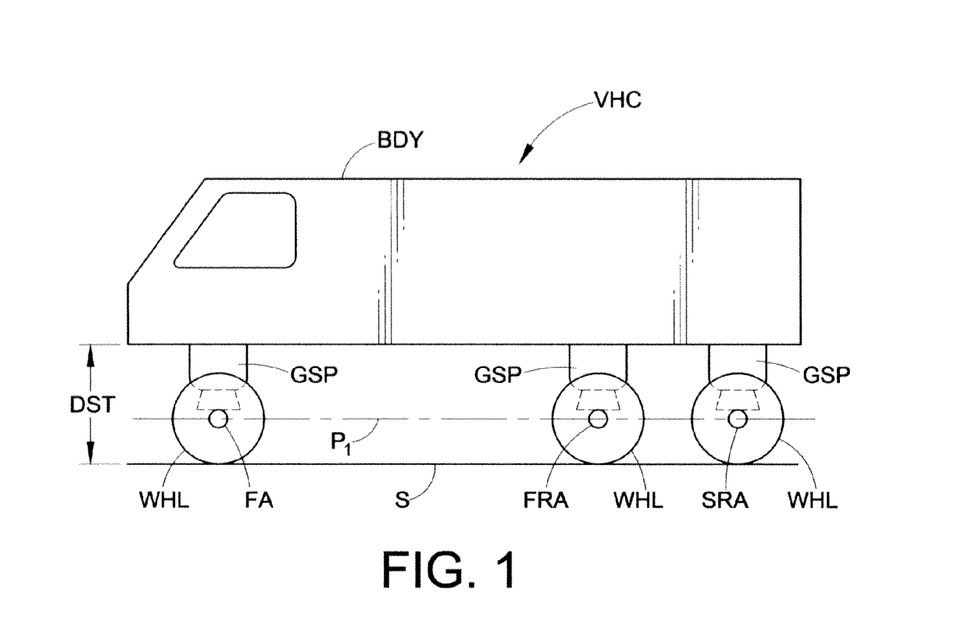
FIG. 1 is a representation of a conventional vehicle having first and second rear axles shown in a leveled orientation while traveling on a generally smooth surface.
Figure 2:
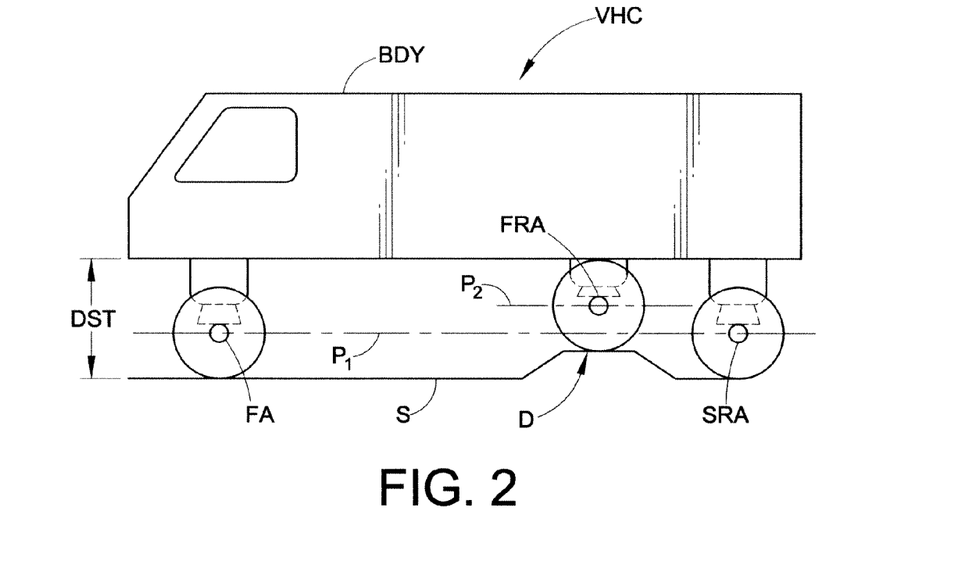
FIG. 2 is a representation of the conventional vehicle in FIG. 1 shown encountering an uneven or elevated surface in which the first rear axle is vertically displaced.

To illustrate such a situation in greater detail, two different conditions of operation are shown in FIGS. 1 and 2. In FIG. 1, a vehicle VHC is shown in use on a relatively flat or smooth surface S (e.g., a conventional roadway) and operating in a first or smooth-surface operating state, in which a front axle FA, a first rear axle FRA and a second rear axle SRA are all generally disposed in approximate alignment within a first plane $P_1$ that is approximately parallel to surface S. In this first operating state, a conventional suspension system would normally monitor one or more suitable height sensors (not shown) and selectively inflate or deflate one or more gas springs GSP of the suspension system to adjust the height and/or orientation of the sprung mass relative to the unsprung mass thereof.

In FIG. 2, however, a second or rough-terrain operating state is shown that illustrates first rear axle FRA of vehicle VHC as being disposed out of first plane $P_1$ and within a second plane $P_2$. Such a condition could be the result of a brief encounter with rough terrain or an otherwise imperfect or uneven surface D. In such a state, first rear axle FRA is no longer coincident or otherwise approximately aligned with front axle FA. As such, a conventional suspension system would be likely to undertake an action to adjust the position and/or orientation of the sprung mass. However, in many situations, such a condition will be a transient or otherwise temporary one. So, it may be undesirable to undertake a height adjustment or leveling action under such a condition.

Additionally, it will be recognized from FIGS. 1 and 2 that the position (and/or orientation) of the sprung mass (e.g., body BDY) of the vehicle relative to surface S will normally be approximately the same under both conditions, as indicated by dimensions DST, which dimensions are shown in FIGS. 1 and 2 as being approximately equal. Thus, under the condition illustrated in FIG. 2, it is possible that the sprung mass has not deviated from the desired position. As such, adjusting the gas springs to vary the height and/or orientation of the sprung mass under such conditions as are shown in FIG. 2 could undesirably result in an adjustment that moves the sprung mass away from the desired position and/or orientation, which deviation will be then be recognized by the suspension system once the transient height change has abated.

In an attempt to overcome the foregoing problems and/or disadvantages, some prior art designs have used momentary time delay processes and/or mechanical height averaging to minimize or reduce any over-responsiveness of the adjustment functions of the associated suspension system. However, these suspension systems have met with limited success, particularly in off-road applications in which long periods of time may be spent on substantially-rough terrain.

Accordingly, it is desirable to develop a vehicle suspension system and method of operating the same that overcomes the foregoing and other problems and disadvantages.

BRIEF DESCRIPTION

One embodiment of a suspension system in accordance with the subject matter of the present disclosure for use on an associated vehicle is provided that is adapted to support an associated sprung mass on an associated unsprung mass of the associated vehicle. The associated vehicle includes a longitudinally extending midline and left and right sides relative to the midline. The associated unsprung mass includes a front axle, a first rear axle, and a second rear axle. The suspension system includes a first left gas spring and a first right gas spring respectively disposed along left-side and right-side portions of the first rear axle. A second left gas spring and a second right gas spring are respectively disposed along left-side and right-side portions of the second rear axle. A pressurized gas system includes a pressurized gas source that is adapted to provide pressurized gas and a control device that is capable of selectively placing the gas springs in fluid communication with one of the pressurized gas source and a pressurized gas exhaust. A first set of height sensors is provided and capable of outputting signals having a relation to relative distances between the first rear axle and the associated sprung mass. The first set of height sensors include a first left height sensor operatively connected along the left-side portion of the first rear axle and a first right height sensor operatively connected along the right-side portion of the first rear axle. A second set of height sensors is provided and capable of outputting signals having a relation to relative distances between the second rear axle and the associated sprung mass. The second set of height sensors includes a second left height sensor operatively connected along the left-side portion of the second rear axle and a second right height sensor operatively connected along the right-side portion of the second rear axle. And, a controller is operatively connected to the first and second sets of height sensors for receiving the signals therefrom and operatively connected to the control device for selectively inflating or deflating respective ones of the gas springs to thereby adjust a leveled orientation of the associated sprung mass. The controller also stores a vertical offset threshold and an articulation offset threshold, and is adapted to determine one or more relative distances between the associated sprung mass and at least one of the first and second rear axles based on the signals from at least a corresponding one of the first and second sets of height sensors. The controller is further adapted to determine that a condition exists for adjusting the leveled orientation of the associated sprung mass based at least in part on the one or more relative distances. The controller is also adapted to calculate a first rear axle to second rear axle vertical offset (RAVO) and a first rear axle to second rear axle articulation offset (RAAO) based at least in part on the one or more relative distances. The controller is also adapted to compare the RAVO to the vertical offset threshold and compare the RAAO to the articulation offset threshold. Upon determining that both of the RAVO and the RAAO are less than the respective vertical and articulation offset thresholds, the controller is adapted to actuate the control device to selectively inflate or deflate one or more of the gas springs and thereby adjust the leveled orientation of the associated sprung mass. Or, upon determining that one of the RAVO and the RAAO is one of equal to or greater than a respective one of the vertical and articulation offset thresholds, the controller is adapted to one of ignore the condition for adjusting the leveled orientation of the associated sprung mass and delay adjusting the leveled orientation of the associated sprung mass until both of the RAVO and the RAAO are less than the respective vertical and articulation offset thresholds.

An exemplary method according to the subject matter of the present disclosure is provided that involves operating a suspension system capable of supporting a sprung mass of a vehicle on an unsprung mass thereof. The vehicle has a longitudinally-extending midline with left and right sides established relative to the midline, and the unsprung mass includes a front axle, a first rear axle and a second rear axle each having left-side and right-side portions. The method includes providing a controller capable of controlling the performance of a leveling action for adjusting a leveled orientation of the sprung mass relative to the unsprung mass. The controller stores a vertical offset threshold and an articulation offset threshold. The method also includes determining a first left height (FLH) between the sprung mass and the left-side portion of the first rear axle, a first right height (FRH) between the sprung mass and the right-side portion of the first rear axle, a second left height (SLH) between the sprung mass and the left-side portion of the second rear axle, and a second right height (SRH) between the sprung mass and the right-side portion of the second rear axle. The method further includes determining, based on at least one of the first left height, the first right height, the second left height and the second right height, that a condition exists for initiating a leveling action to adjust the leveled orientation of the sprung mass of the vehicle. The method also includes calculating at least one of a first rear axle to second rear axle vertical offset (RAVO) and first rear axle to second rear axle articulation offset (RAAO), and comparing at least one of the RAVO and the RAAO with a corresponding one of the vertical offset threshold and the articulation offset threshold. And, if at least one of the RAVO and the RAAO is equal to or greater than the corresponding one of the vertical offset threshold and the articulation offset threshold, then performing one of (1) delaying initiation of a leveling action until each of the RAVO and the RAAO is less than the corresponding one of the vertical offset threshold and the articulation offset threshold and (2) ignoring the condition for initiating a leveling action. Or, if each of the RAVO and the RAAO is less than the corresponding one of the vertical offset threshold and the articulation offset threshold, initiating a leveling action to adjust the leveled orientation of the sprung mass of the vehicle.

Yet another exemplary method according to the subject matter of the present disclosure involves controlling a suspension system that is capable of supporting a sprung mass on an unsprung mass of a vehicle. The vehicle has a longitudinally-extending midline with left and right sides disposed relative to the midline. The unsprung mass includes a front axle, a first rear axle and a second rear axle each having left-side and right-side portions. The method includes providing a plurality of gas springs with one of the plurality of gas springs disposed along a different one of each of the left-side and right-side portions of each of the front axle, the first rear axle and the second rear axle. The method also includes providing a plurality of height sensors with one of the plurality of height sensors operatively connected between the sprung mass and a different one of each of the left-side and right-side portions of each of the front axle, the first rear axle and the second rear axle. The plurality of height sensors being capable of outputting signals having a relation to a respective distance between the sprung mass and a respective one of the axles. The method further includes providing a pressurized gas system that includes a pressurized gas source adapted to provide pressurized gas and that includes a control device capable of selectively placing the gas springs in fluid communication with one of the pressurized gas source and a pressurized gas exhaust. The method also includes providing a controller in communication with the plurality of height sensors for receiving height signals therefrom, with the controller being in communication with the control device for selectively inflating and deflating respective ones of the gas springs to adjust a leveled orientation of the associated sprung mass. The method further includes programming a vertical offset threshold into the controller, and determining one or more relative distances between the sprung mass and one or more of the front axle, the first rear axle and the second rear axle based on the signals from the plurality of height sensors. The method also includes determining that a condition exists for adjusting the leveled orientation of the sprung mass based at least in part on the one or more relative distances, and calculating a first rear axle to second rear axle vertical offset (RAVO) based at least in part on one or more of the relative distances. The method further includes comparing the RAVO to the vertical offset threshold, permitting a leveling activity upon determining that the RAVO is less than the vertical offset threshold and actuating the control device to selectively inflate or deflate one or more of the gas springs. Or, prohibiting the leveling activity upon determining that the RAVO is equal to or greater than the vertical offset threshold, and one of ignoring the condition for adjusting the leveled orientation of the associated sprung mass and waiting until the RAVO is less than the vertical offset threshold before initiating the leveling activity.

DETAILED DESCRIPTION

Figure 3:
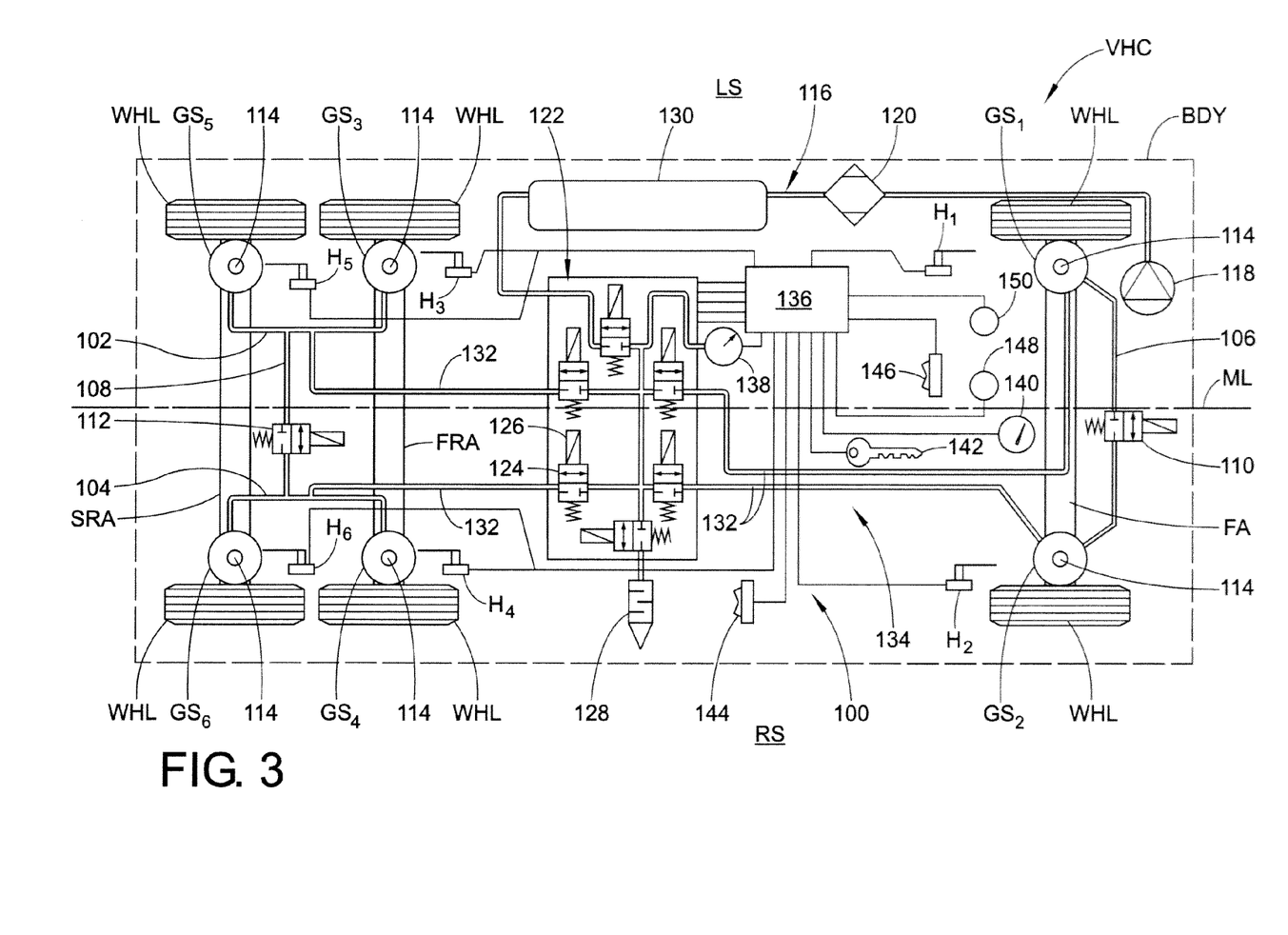
FIG. 3 is a schematic representation of one example of a suspension system in accordance with the present novel concept shown on an associated vehicle.

Turning now to FIGS. 3-9, wherein the showings are for the purpose of illustrating exemplary embodiments of the present novel concept and not for the purpose of limiting the same, FIG. 3 illustrates an embodiment of a suspension system 100 disposed in operative association between a sprung mass, such as an associated vehicle body BDY, for example, and an unsprung mass, such as an associated wheel WHL, an associated front axle FA, an associated first rear axle FRA and an associated second rear axle SRA, for example, of an associated vehicle VHC. For the sake of clarity, suspension system 100 will be described herein with reference to a longitudinally-extending midline ML that generally defines a transition between a left side LS and a right side RS of the associated vehicle.

With continued reference to FIG. 3, suspension system 100 includes a plurality of gas spring assemblies $GS_1$-$GS_6$ with a different one of the plurality of gas spring assemblies disposed along a respective left and right side of each of front axle FA, first rear axle FRA and second rear axle SRA. In particular, front left spring $GS_1$ and front right spring $GS_2$ can be disposed at respective left and right sides of front axle FA. Similarly, first left spring $GS_3$ and first right spring $GS_4$ can be disposed at respective left and right sides of first rear axle FRA. Also, second left spring $GS_5$ and second right spring $GS_6$ can be disposed at respective left and right sides of second rear axle SRA.

Furthermore, for added stability and/or simplicity of control of rear axle springs $GS_3$-$GS_6$, the left side springs and right side springs can optionally be fluidically connected or otherwise commonly linked, such as, for example, by fluid lines 102 and 104 which respectively connect gas spring $GS_3$ with $GS_5$ and gas spring $GS_4$ with $GS_6$. Further still, suspension system 100 can, optionally, be adapted to selectively permit fluid communication between one or more of the gas springs on the left and right sides of the associated vehicle. For example, suspension system 100 can include a first or front cross-flow fluid line 106 and/or a second or rear cross-flow fluid line 108, which are capable of fluidically connecting gas springs $GS_1$ and $GS_2$ and gas springs $GS_3$-$GS_6$, respectively. Gas flow through the first and second cross-flow lines can be selectively controlled in any suitable manner, such as by using control devices 110 and 112, for example, which are shown in FIG. 3 as being respectively fluidically connected therealong. Suspension system 100 will also normally include a plurality of dampers 114, which can be operatively disposed between the sprung and unsprung masses in any suitable manner.

Suspension system 100 also includes a plurality of height sensing devices, such as height sensors $H_1$-$H_6$, for example. The height sensing devices can be of any suitable type or kind (e.g., mechanically-linked rotary potentiometers, linear transducers, ultrasonic wave sensors, electromagnetic wave sensors), and can be provided in any suitable arrangement or configuration. In one exemplary embodiment, height sensors $H_1$-$H_6$ are disposed in generally proximal relation to fluid springs $GS_1$-$GS_6$ for outputting signals indicative of or otherwise having a relation to a height of the fluid spring or a distance between the associated sprung mass and the unsprung mass of the associated vehicle.

Suspension system 100 also includes a pressurized-gas supply system 116 operatively associated with the gas spring devices for selectively supplying pressurized gas thereto and selectively transferring pressurized gas therefrom. In the exemplary embodiment shown in FIG. 3, gas supply system 116 includes a pressurized gas source, such as a compressor 118, for example, for generating pressurized gas (e.g., pressurized air). Optionally, the gas supply system can also include any suitable gas-treatment device or devices, such as a dryer 120, for example, that may be capable of removing moisture and/or other contaminants from the gas within the gas supply system. Additionally, one or more control devices of any suitable type or kind can be operatively connected within gas supply system 116 for selectively controlling the transfer of pressurized gas therethrough. As one example, a valve assembly 122 is shown in FIG. 3 as being in communication with compressor 118, and it will be appreciated that such a valve assembly can be of any suitable configuration or arrangement. In the exemplary embodiment shown, valve assembly 122 includes a plurality of valves 124 with corresponding valve actuators 126 operatively connected thereto for selectively opening and closing the valves. Valve assembly 122 can also include a suitable exhaust, such as a muffler 128, for example, for venting pressurized gas from the system. Optionally, pressurized-gas supply system 116 can also include a pressurized-gas storage device that is suitable for storing a quantity or volume of pressurized gas, such as, for example, a reservoir 130 that is shown in FIG. 3 as being in fluid communication with valve assembly 122.

Valve assembly 112 can be placed in communication with gas springs $GS_1$-$GS_6$ in any suitable manner, such as through suitable fluid transmission lines 132, for example. As such, pressurized gas can be selectively transmitted to and/or from the gas or fluid spring devices through valve assembly 122, such as to alter or maintain vehicle height at one or more corners of the vehicle, for example.

Suspension system 100 also includes a control system 134 in communication with various systems and components of the suspension system for selective operation and control thereof. Control system 134 can include components of any suitable type and/or kind, and in any suitable arrangement or configuration. Additionally, it will be appreciated that control system 134 and the components and other systems thereof can be in communication in any suitable manner, such as by using directly communicated signals (e.g., electrical signals via a hardwired leads, RF or other wireless signals or optical cabling) or communication signals transmitted in a suitable manner via a vehicle or system network, for example. In the embodiment shown in FIG. 3, the control system includes a controller or electronic control unit 136 in communication with compressor 118 and valve assembly 122 in a suitable manner, such as through suitable leads or connections, for example. Preferably, the controller is adapted to selectively operate and/or control at least compressor 118 and valve assembly 122, such as for supplying and exhausting pressurized gas to and from gas spring assemblies $GS_1$-$GS_6$, for example.

Control system 134 is also operative to monitor height sensors $H_1$-$H_6$. Controller 136 can be in communication with height sensors $H_1$-$H_6$ in any suitable manner, such as, for example, by using analog or digital wireless RF telemetry, optical cabling or conventional wire-type leads, as is shown in FIG. 3. Similarly, control system 134 could also, optionally, be operative to monitor the gas pressure within gas supply system 116, and could do so in any suitable manner. For example, the control system can include a pressure sensor 138 in operative association with valve assembly 110, which pressure sensor can generate pressure signals having a relation to the gas pressure one or more components or fluidically-distinct portions of the gas supply system and communicate such pressure signals to a suitable component or system, such as controller 136, for example. Alternately, multiple pressure sensors could be used. Thus, it will be appreciated that any suitable type, kind or arrangement of pressure sensing devices, if provided, could be used.

Furthermore, control system 134 can also optionally include any other suitable devices, components and/or systems as may be desired for a given application and/or use. For example, control system can optionally include a speed sensing device 140, an ignition sensing device 142 and/or one or more operator-interface devices 144-150, which devices are in communication with controller 136 in a suitable manner, such a through suitable connections or leads. Preferably, the speed sensing device, if provided, is operative to generate speed sensor signals indicative of or otherwise having a relation to the speed of the vehicle and to communicate the speed sensor signals to a suitable system or component, such as controller 136, for example. Preferably, the ignition sensing device, if provided, is operative to generate a signal indicative or otherwise related to an operational status or condition of the vehicle (e.g., ON or OFF). Operator-interface devices 144-150, if provided, are preferably suitable for communicating information, communications, data and/or signals of any suitable type or kind to an operator and/or receiving input information, communications, data and/or signals of any suitable type or kind from an operator. One example of a suitable operator-interface device is shown in FIG. 3 as including selector switches 144 and 146, which are shown as being in communication with controller 136 through a suitable connections or leads. As another example, indicator lamps 148 and 150 can be included. It will be appreciated, however, that any other suitable device, component and/or arrangement can alternately, or additionally, be used. For example, a plurality of switches or buttons, a touch-screen display, or a voice recognition system could alternately be used.

Further still, it will be appreciated that controller 136 can be of any suitable type, kind and/or construction. In the exemplary embodiment shown, controller 136 includes a processing device (not shown) which can be of any suitable type and/or kind, such as a microprocessor, microcomputer or microcontroller, for example. Additionally, controller 136 can optionally include a memory (not shown) in communication with processing device. Memory can be of any suitable type or kind, such as a volatile or non-volatile memory, for example, and is preferably suitable for receiving and/or storing data, values, signals, information, communications, algorithms and/or routines in any suitable form or format, such as in the form of software programs or code, for example.

Figure 4:
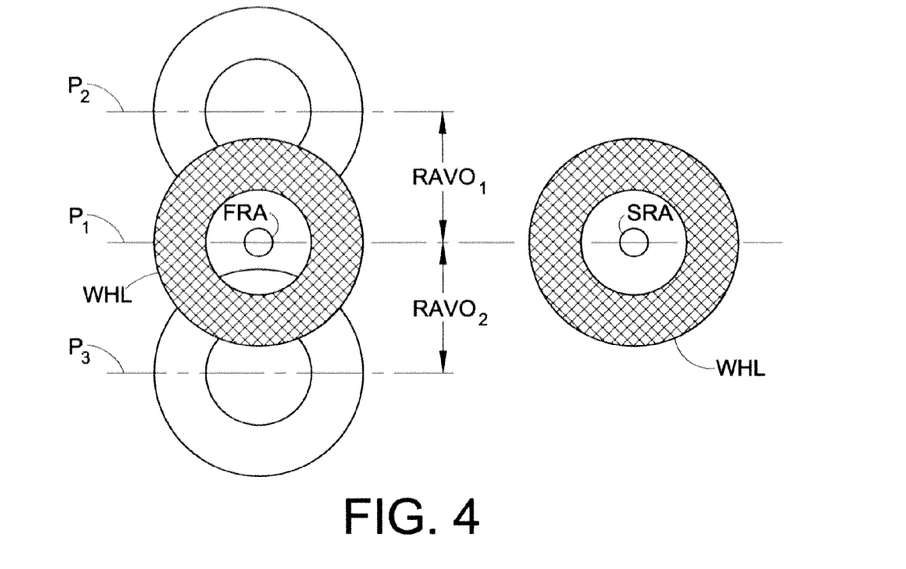
FIG. 4 is a side elevation view of the first and second rear axles of the associated vehicle in FIG. 3 illustrating a rear axle vertical offset between the first and the second rear axles after encountering an uneven or elevated surface, such as that in FIG. 2.
Figure 5:
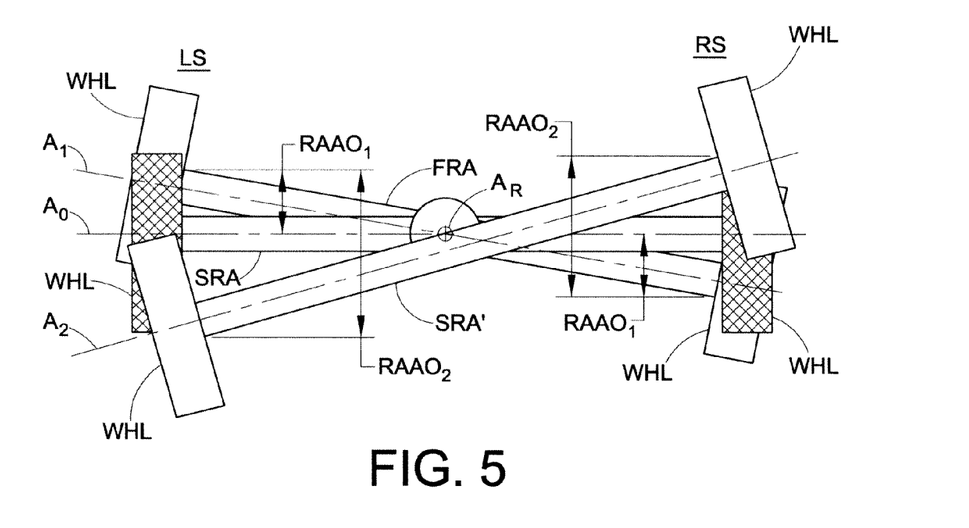
FIG. 5 is a rear elevation view of the first and the second rear axles of the associated vehicle in FIG. 3 illustrating a rear axle articulation offset between the first and the second rear axles.

With reference to FIGS. 4 and 5, the general offset characteristics of first rear axle FRA and second rear axle SRA are described in greater detail. Generally, two (2) types of offsets can occur when the suspension system of the vehicle is in the second or partially displaced state or condition, such as that illustrated in FIG. 2, for example. The first offset involves a vertical displacement of one rear axle with respect to the other. For example, a first rear axle vertical offset $RAVO_1$ can be defined as occurring when first rear axle FRA moves from first plane $P_1$ to a position coincident or otherwise approximately aligned with second plane $P_2$. Similarly, a second rear axle vertical offset $RAVO_2$ can be defined, for example, as occurring when the first rear axle moves to a position coincident or otherwise approximately aligned with a third plane $P_3$. It will be appreciated that a similar vertical offset condition can and will occur in which the second rear axle is displaced relative to the first rear axle. Thus, it will be understood that the conditions shown and described in FIG. 4 are merely exemplary.

As shown in FIG. 5, a second type or form of offset involves an angular displacement of one rear axle relative to the other rear axle. For example, a first rear axle articulation offset $RAAO_1$ can be defined as a relative vertical offset between the left or right side of first rear axle FRA relative to the corresponding side of second rear axle SRA. In particular, the first rear axle and the second rear axle generally share an axis of rotation $A_R$ which extends along a longitudinal axis or midline of the associated vehicle. To further illustrate rear axle articulation offset $RAAO_1$, first rear axle FRA is displaced in a generally clockwise orientation such that wheel WHL on left side LS is elevated and wheel WHL on right side RS is lowered relative to second rear axle SRA. That is, first rear axle FRA is shown as being coincident or otherwise approximately aligned with a first axis $A_1$ that is rotated clockwise about axis $A_R$ relative to second rear axle SRA, which second rear axle is shown as being disposed in approximate alignment with a neutral axis $A_0$ that could approximately correspond to a condition or alignment associated with normal operation on a smooth and level surface (e.g., a conventional roadway).

As a further example, another position and/or orientation of second rear axle SRA' is shown in FIG. 5 in which second rear axle SRA' is displaced in a counterclockwise direction to a position that is coincident or otherwise in approximate alignment with a second axis $A_2$. In this example, second rear axle SRA' is displaced such that wheel WHL on left side LS is lowered and wheel WHL on right side RS is elevated. Thus, first rear axle FRA is displaced in one direction and second rear axle SRA' is displace in the opposite direction such that the general disparity in height between the respective left sides of first rear axle FRA as compared to second rear axle SRA' can define a second rear axle articulation offset $RAAO_2$. Additionally, it will be appreciated that rear axle vertical offset RAVO and rear axle articulation offset RAAO can be calculated or otherwise determined in any suitable manner, such as by using height values generated by the output of height sensors $H_3$-$H_6$, for example.

Figure 6:
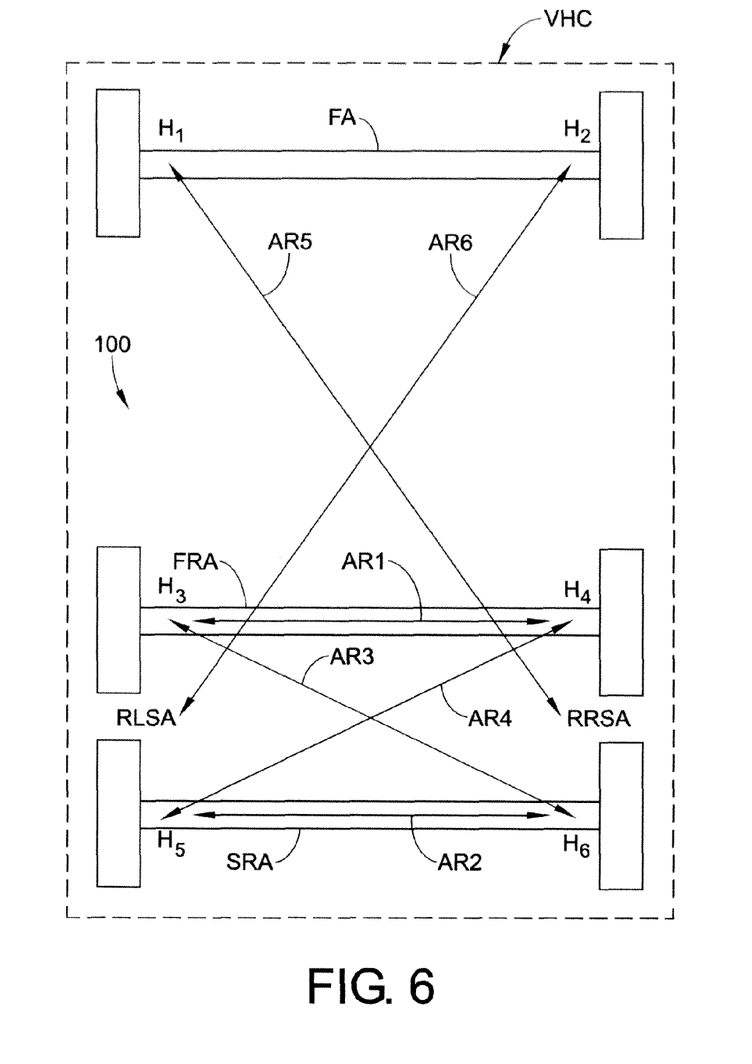
FIG. 6 is a schematic representation of a forward axle and the first and second rear axles of the associated vehicle illustrating a plurality of comparisons of relative height values from the plurality of height sensors in FIG. 3.

With reference now to FIG. 6, a simplified schematic view of suspension system 100 of vehicle VHC is shown. Specifically, the general location of the height sensors is indicated by reference characters $H_1$-$H_6$ along front axle FA, first rear axle FRA and second rear axle SRA. In addition, numerous reference arrows are shown to illustrate the various comparisons that can be made between the height sensor output values of suspension system 100. For example, an average of the values from height sensors $H_3$ and $H_4$ and from height sensors $H_5$ and $H_6$ can be determined, as indicated by arrows AR1 and AR2, respectively. As such, a rear axle vertical offset RAVO could be calculated by taking the average of the value from height sensors $H_3$ and $H_4$, and subtracting therefrom the average of the value from height sensors $H_5$ and $H_6$.

Additionally, an average of the values from height sensors $H_3$ and $H_6$ and from $H_4$ and $H_5$ can be determined as indicated by arrows AR3 and AR4, respectively. As such, a rear axle articulation offset RAAO could be calculated by using the average of the value from height sensors $H_3$ and $H_6$ and subtracting therefrom the average value from height sensors $H_4$ and $H_5$.

Optionally, an additional or alternate determination could be used in which a left side rear axle height average RLSA is calculated or otherwise determined, such as by averaging the values from height sensors $H_3$ and $H_5$, for example. Similarly, a right side rear axle height average RRSA can be calculated or otherwise determined, such as by averaging the values from height sensors $H_4$ and $H_6$, for example. A front to rear axle articulation offset FRAAO could then be calculated or otherwise determined, such as by averaging the value of height sensor $H_1$ with right side average RRSA, which average is indicated by arrow AR5, and by averaging the value of height sensor $H_2$ with left side average RLSA, which average is indicated by arrow AR6. The average indicated by arrow AR5 can then be subtracted from the average represented by arrow AR6 to calculate or otherwise determine the front-to-rear articulation offset. Based on the various offsets described above with reference to FIG. 4-6, control system 134 of suspension system 100 could determine if the operating condition of the vehicle is suitable for undertaking a leveling activity, as will be discussed in greater detail below.

Figure 7:
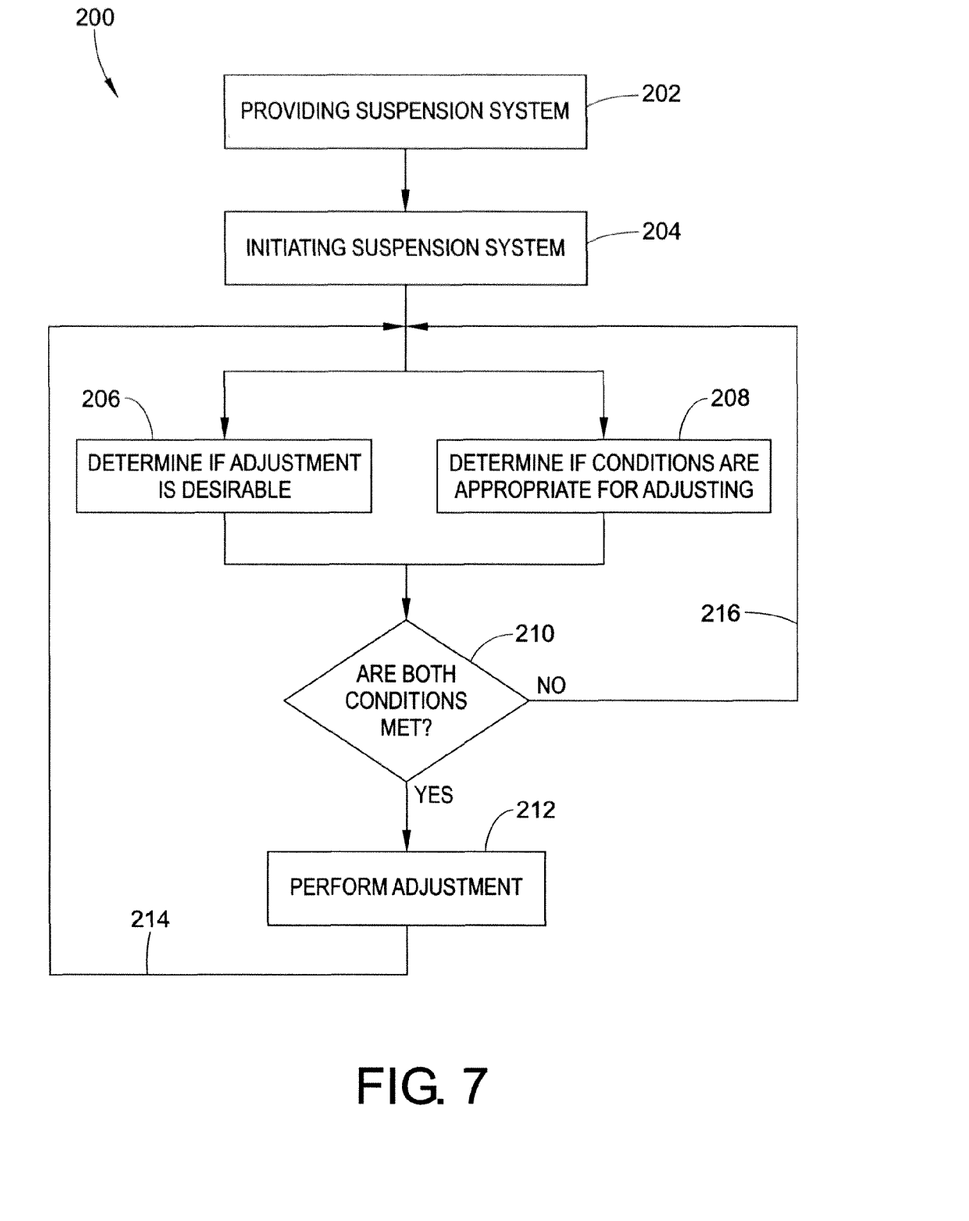
FIG. 7 is a flowchart diagram illustrating one exemplary method in accordance with the present novel concept of operating a suspension system of a vehicle having at least two rear axles.

Turning now to FIG. 7, a method 200 of operating a suspension system includes providing a suspension system, such as suspension system 100, for example, for use on a vehicle having at least two rear axles and which suspension system is adapted to or is otherwise capable of operation in accordance with the subject matter of the present disclosure, as indicated by box 202. This can include providing a suspension system having a control system that is capable of adjusting a height and/or orientation of the associated sprung mass of the vehicle relative to the unsprung mass of the vehicle. The control system also preferably includes a controller that is capable of storing data and/or information corresponding to a vertical offset threshold, an articulation offset threshold and/or a front-to-rear offset threshold. The suspension system also preferably includes a plurality of height sensors, such as the height sensors $H_1$-$H_6$ discussed previously.

Method 200 also includes activating, initiating or otherwise starting the suspension system, as indicated by box 204. Such an initiating action can include any suitable activities, such as, for example, energizing or otherwise powering any devices, components and/or systems of the suspension system, testing or calibrating any sensing devices or other components, determining any initial values or acquiring any preliminary data, and initializing any software or firmware algorithms, routines or programs for operating the suspension system. Additionally, it will be appreciated that such an initiating or starting action can be triggered in any suitable manner, such as, for example, by an operator turning an ignition key that generates a signal that is sensed by ignition-sensing device 142 (FIG. 3) or by an operator switching the position or state (e.g., ON/OFF) of a selector switch or other suitable input device, such as one of switches 144 or 146 (FIG. 3), for example.

Once the suspension system has been initiated, as indicated by box 204, method 200 includes determining whether conditions exist for which it is desirable to adjust of the height and/or orientation of the sprung mass, as indicated by box 206. Such a determination can be made in any suitable manner, such as by determining that one or more height values from a corresponding one or more of the height sensors (e.g., height sensors $H_1$-$H_6$ in FIG. 3) are outside a desired target range, for example. Additionally, or in the alternative, an operator-inputted signal, such as a manual height-selection signal from one of selector switches 144 or 146 (FIG. 3), for example, could indicate that a height and/or orientation adjustment is desired. Method 200 also includes determining if the vehicle is operating under conditions for which adjustment of the height and/or orientation of the sprung mass would be appropriate, as indicated by box 208.

It will be appreciated that the determining actions represented by boxes 206 and 208 can be performed in any suitable manner or sequence. For example, these actions could be performed in a serial manner, such that one action is performed first and regularly repeated. The other action could then be performed second and only when certain results are returned by the first action, which results would trigger the performance of the second action. Alternately, in a preferred arrangement shown in FIG. 7, the determining actions represented by boxes 206 and 208 can be performed in approximately parallel relation to one another. As one example of such an approximately parallel performance, the actions could be performed by a single processing device, such as a processing device of controller 136 (FIG. 3), for example, by time-slice processing or otherwise multitasking the performance of these two actions. As such, it will be appreciated that these two actions (i.e., those represented by boxes 206 and 208) can be performed at different frequencies or periods of performance, such as by performing the action represented by box 206 about every 50 to 500 milliseconds and performing the action represented by box 208 about every 500 to 4000 milliseconds, for example.

To initiate a height change and/or leveling adjustment action on a vehicle having two or more rear axles, the associated vehicle is preferably both undergoing a condition in which it is desired to make an adjustment as well as being in a state in which it would be appropriate to perform such an adjustment. Having made at least one determination with regard to each of the actions in boxes 206 and 208, as discussed above, method 200 reaches a decision box 210 at which it is determined whether both the adjustment-desirability condition (i.e., box 206) and the appropriateness condition (i.e., box 208) are met. Preferably, this determination is based, at least in part, on the resulting determinations made in boxes 206 and 208. If both conditions are met, a YES determination is made in decision box 210 and method 200 proceeds to perform a suitable adjustment action, as indicated by box 212. It will be appreciated that such an adjustment action can be at least partially performed or otherwise executed in any suitable manner.

Having initiated or at least partially performed the adjustment action, method 200 can then return, as indicated by arrow 214, to again perform one or more occurrences of boxes 206 and 208. However, if both conditions are not met, a NO determination is made in decision box 210 and method 200 can return, as indicated by arrow 216, to again perform one or more occurrences of the actions represented by boxes 206 and 208. Thus, the determination that a height and/or orientation adjustment is desired is ignored. Optionally, method 200 could alternately include waiting a predetermined period of time before returning along arrow 216 or could alternately include delaying further action until both conditions are met and then performing the adjustment action in box 212.

According to one exemplary performance of method 200, the actions in boxes 206-212 could be regularly repeated, such as at ongoing and continual predetermined intervals, for example. During many iterations, a NO determination may be returned at decision box 210 indicating that the conditions for leveling have not been met. During iterations in which a YES determination is returned at decision box 210, an adjustment action can be at least partially performed, as indicated by box 212. This leveling or adjustment action can continue until an iteration occurs in which a NO determination is returned at decision box 210. At which point, any ongoing leveling or adjustment of the action is stopped. In this exemplary performance of method 200, such a NO determination will occur when conditions are inappropriate for leveling, such as may be determined in box 208. Additionally, however, such a NO determination will occur when the vehicle is at least approximately level, such as when the height values are within height ranges or tolerances, for example. Thus, in this manner, a control system performing the method could determine that it is appropriate to stop leveling the vehicle because the target height has been reached. The performance of the actions in boxes 206-212 could then be continued to be performed and would repeatedly return a NO indication at box 210 until the leveled condition of the vehicle deviated from the target or desired condition, at which point a leveling action in box 212 could again be initiated or otherwise at least partially performed.

Figure 8:
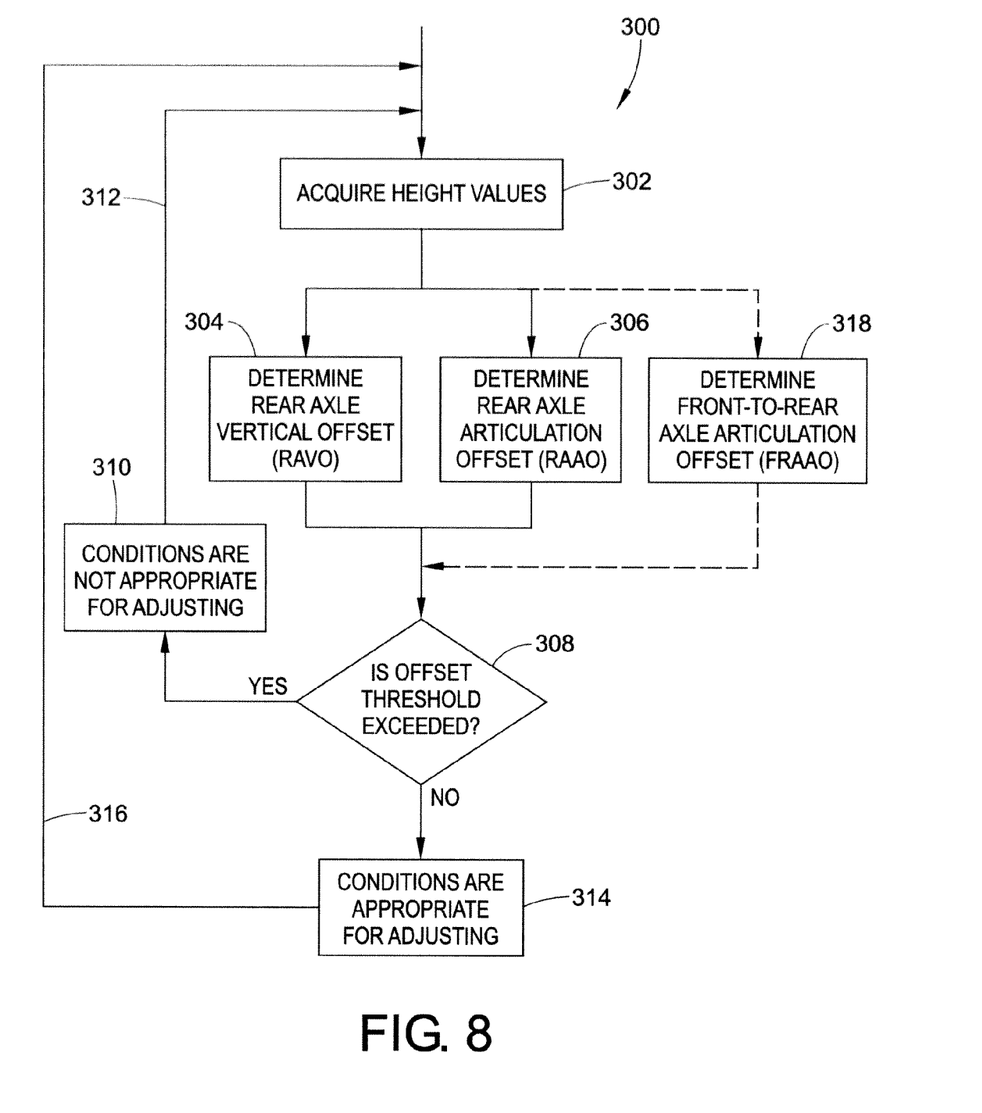
FIG. 8 is a flowchart diagram illustrating one exemplary method in accordance with the present novel concept for determining whether a condition exists that is suitable for adjusting a height and/or orientation of a vehicle having at least two rear axles.

Turning now to FIG. 8, a method 300 of determining whether conditions exist that are suitable or otherwise appropriate for adjusting a height and/or orientation of the sprung mass of an associated vehicle, such as is represented by box 208 in FIG. 7, for example, includes acquiring one or more height values from a corresponding one or more of height sensors $H_1$-$H_6$, as indicated by box 302. Method 300 also includes determining a value of any rear axle vertical offset RAVO between two of the rear axles of a vehicle, such as axles FRA and SRA of vehicle VHC in FIG. 3, for example, as indicated by box 304. It will be appreciated that such a rear axle vertical offset can be calculated or otherwise determined in any suitable manner. For example, the rear axle vertical offset can be represented as follows:

$$RAVO = \frac{(FLH + FRH)}{2} - \frac{(SLH + SRH)}{2}$$

where:
FLH represents a first, left height value, such as from height sensor $H_3$ in FIG. 3, for example;
FRH represents a first, right height value, such as from height sensor $H_4$ in FIG. 3, for example;
SLH represents a second, left height value, such as from height sensor $H_5$ in FIG. 3, for example; and,
SRH represents a second, right height value, such as from height sensor $H_6$ in FIG. 3, for example.

Method 300 can also, optionally, include determining a value of any rear axle articulation offset RAAO between two of the rear axles of a vehicle, such as axles FRA and SRA of vehicle VHC in FIG. 3, for example, as indicated by box 306. It will be appreciated that such a rear axle articulation offset can be calculated or otherwise determined in any suitable manner. For example, the rear axle articulation offset can be represented as follows:

$$RAAO = \frac{(FLH + SRH)}{2} - \frac{(SLH + FRH)}{2}$$

where FLH, FRH, SLH and SRH represent the height values discussed above.

Having determined values for rear axle vertical offset RAVO, as indicated by box 304, and, optionally, for rear axle articulation offset RAAO, as indicated by box 306, method 300 proceeds to decision box 308 at which it is determined whether either of the vertical offset threshold or, optionally, the articulation offset threshold has been, respectively, exceeded by the RAVO value or the RAAO value, respectively. That is, it is determined at decision box 308 whether the RAVO value is greater than or equal to the vertical offset threshold and, optionally, whether the RAAO value is greater than the articulation offset threshold. If either of the offset thresholds is equaled or exceeded, a YES determination is reached in decision box 308, which indicates that conditions are inappropriate for adjusting the height and/or orientation of the sprung mass of the vehicle, as indicated by box 310. Optionally, data, values, flags or other indicators of any suitable type or kind can be set or otherwise stored for use in conveying to another action (e.g., an upper level routine or program, such as method 200) that conditions are inappropriate for performing an adjustment action. Once box 310 has been reached, method 300 returns to box 302, as indicated by arrow 312, to acquire new height values and repeat the determinations in at least boxes 304-308.

On the other hand, if it is determined at decision box 308 that the RAVO value and the optional RAAO value are less than the respective vertical and articulation offset thresholds, then a NO determination is reached in decision box 308. This would indicate that the operating conditions of the vehicle are appropriate for the performance of a height and/or orientation adjustment, as indicated by box 314. Accordingly, data, values, flags or other indicators of any suitable type or kind can optionally be set or otherwise stored for use in conveying to another action (e.g., an upper level routine or program, such as method 200) that conditions are appropriate for performing an adjustment action. Once box 314 has been reached, method 300 returns to box 302, as indicated by arrow 316, to acquire new height values and repeat the determinations in at least boxes 304-308.

As an additional or alternate determination, method 300 can optionally include determining a front-to-rear axle articulation offset FRAAO, as indicated by box 318. It will be appreciated that such a front-to-rear axle articulation offset FRAAO can be calculated or otherwise determined in any suitable manner. For example, a left-side rear-axle height average RLSA and a right-side rear-axle height average RRSA can be calculated as follows:

$$RLSA = \frac{(FLH + SLH)}{2}$$

$$RRSA = \frac{(FRH + SRH)}{2}$$

where FLH, FRH, SLH and SRH represent the height values discussed above.

The left-side rear-axle height average RLSA and the right-side rear-axle height average RRSA can then be used to calculate the front-to-rear axle articulation offset FRAAO value as follows:

$$FRAAO = \frac{(TLH + RRSA)}{2} - \frac{(TRH + RLSA)}{2}$$

where:
TLH represents a third, left height value, such as from height sensor $H_1$ in FIG. 3, for example;
TRH represents a third, right height value, such as from height sensor $H_2$ in FIG. 3, for example;
RLSA represents a left-side rear-axle height average value as determined above; and,
RRSA represents a right-side rear-axle height average value as determined above.

As will be recognized from the foregoing relationship, this exemplary determination of the FRAAO value averages the height values from front axle height sensors $H_1$ and $H_2$ with the left side and right side averages of the rear axles.

Alternately, the front-to-rear axle articulation offset FRAAO value could be calculated or otherwise determined using to following relationship:

$$FRAAO = \frac{(TLH + FRH)}{2} - \frac{(TRH + FLH)}{2}$$

where FLH, FRH, TLH and TRH represent the height values discussed above.

As will be recognized from the foregoing relationship, this exemplary determination of the FRAAO value averages the height values from front axle height sensors $H_1$ and $H_2$ with the height values from first rear axle height sensors $H_3$ and $H_4$.

Having determined the optional front-to-rear axle articulation offset FRAAO value in box 318, method 300 again reaches decision box 308. As discussed above, it is determined at decision box 308 whether either of the vertical offset threshold or the articulation offset threshold has been exceeded by the RAVO value or the RAAO value, respectively. Thus, if the optional FRAAO value is determined in box 318, a determination as to whether a front-to-rear offset threshold has been exceeded by the FRAAO value can optionally be made at decision box 308. Any such front-to-rear offset threshold can be provided in any suitable manner, such as by storing data and/or values relating thereto in controller 136 (FIG. 3), for example.

In addition to corresponding determinations made with regard to RAVO and optional RAAO, if it is determined in box 308 that the front-to-rear offset threshold is equaled or exceed by the FRAAO value, a YES determination is made in box 308. This YES determination indicates that conditions are inappropriate for adjusting the height and/or orientation of the sprung mass of the vehicle, as indicated by box 310. Optionally, data, values, flags or other indicators of any suitable type or kind can be set or otherwise stored for use in conveying to another action (e.g., an upper level routine or program, such as method 200) that conditions are inappropriate for performing an adjustment action. Once box 310 has been reached, method 300 returns to box 302, as indicated by arrow 312, to acquire new height values and repeat the determinations in at least boxes 304-308.

If, however, it is determined in box 308 that, in addition to corresponding determinations made with regard to RAVO and optional RAAO, the FRAAO value is less than the front-to-rear offset threshold, a NO determination would be made in box 308. This would indicate that the operating conditions of the vehicle are appropriate for the performance of a height and/or orientation adjustment, as indicated by box 314. Accordingly, data, values, flags or other indicators of any suitable type or kind can optionally be set or otherwise stored for use in conveying to another action (e.g., an upper level routine or program, such as method 200) that conditions are appropriate for performing an adjustment action. Once box 314 has been reached, method 300 returns to box 302, as indicated by arrow 316, to acquire new height values and repeat the determinations in at least boxes 304-308.

Figure 9:
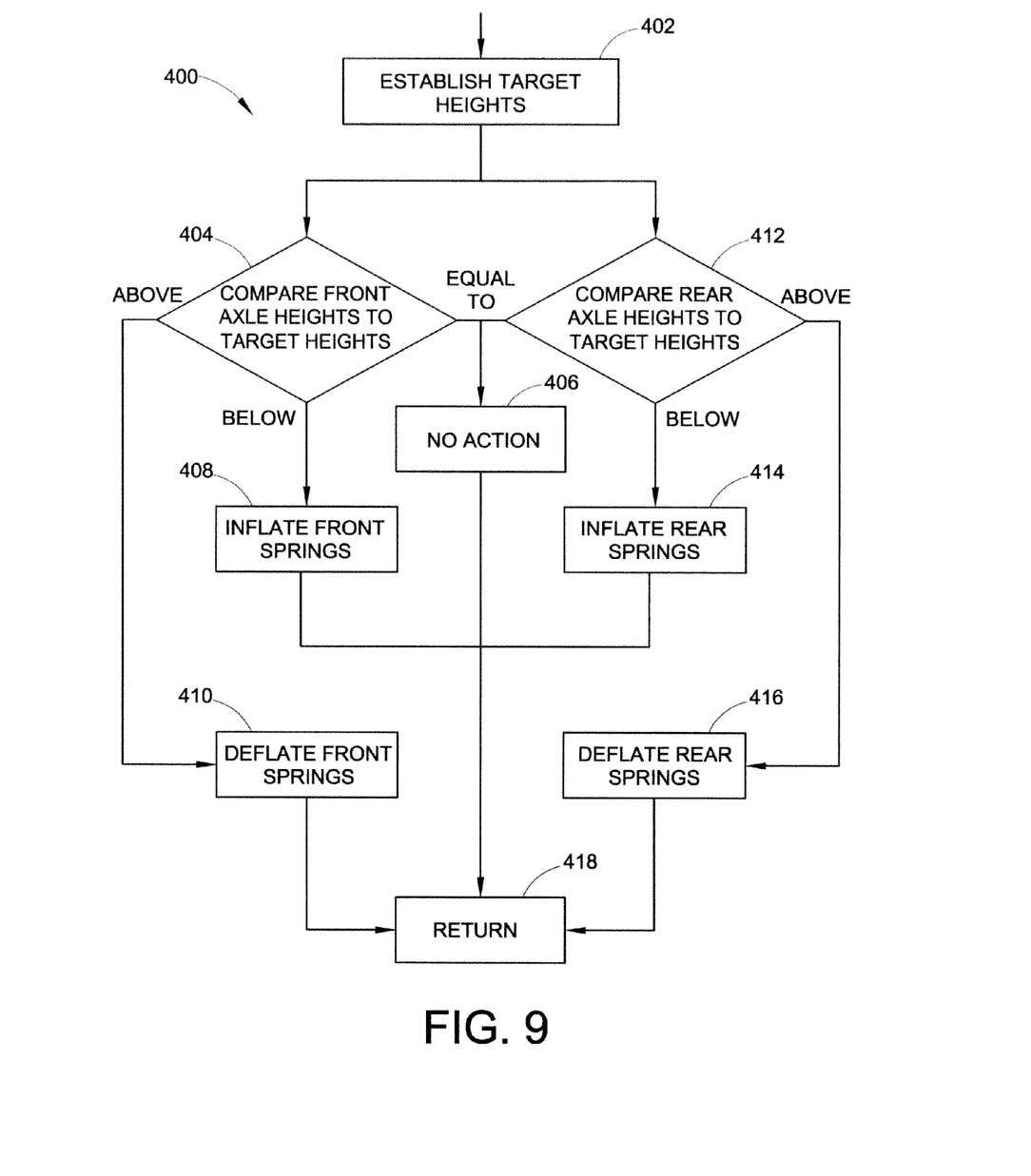
FIG. 9 is a flowchart diagram illustrating one exemplary method in accordance with the present novel concept of leveling a vehicle having at least two rear axles.

With reference to FIG. 9, a method 400 of performing an adjustment action on a vehicle having two or more rear axles, such as is represented by box 212 in FIG. 7, for example, includes establishing one or more target heights, as indicated by box 402. It will be appreciated that such one or more target heights can be established in any suitable manner, such as by calculating the one or more target heights based on any one or more of a vehicle load, speed, acceleration (vertical, lateral and/or longitudinal), slope or incline and/or other conditions. Additionally, target heights can also be established based, at least in part, on operator-inputted height data and/or signals, such as may be inputted using a selector switch 144 or 146 in FIG. 3, for example. In one preferred embodiment, a target height is established for each of height sensors $H_1$ to $H_6$. However, it will be appreciated that other arrangements could alternately be used.

Method 400 also includes comparing acquired height values for one or more of the axles of the vehicle to the corresponding target heights determining whether one or more of the corresponding gas springs should be inflated or deflated to achieve the desired or target height. It will be appreciated that performing such adjustments of height and/or orientation can be executed in any suitable manner. For example, target heights for front gas springs $GS_1$ and $GS_2$ are compared with corresponding values generated by front height sensors $H_1$ and $H_2$, as indicated in box 404. If one or more of these actual and target heights are approximately equal, no adjustment is to be performed for the corresponding spring or springs, as indicated in box 406. If, however, one or more of the actual heights of the front gas springs are below the front target heights, the corresponding one or more front gas springs could be inflated, as indicated by box 408. If, on the other hand, one or more of the actual heights of the front gas springs are above the front target heights, the corresponding one or more front gas springs could be deflated, as indicated by box 410.

As another example, the average left side and right side heights of the rear axles RLSA and RRSA, such as have been discussed above with regard to method 300 in FIG. 8, for example, which would preferably have been previously determined from an earlier step or method, can be to compared to corresponding rear target heights, as indicated in box 412. If either or both of these average heights is approximately equal to the corresponding target height, no adjustment is performed for the corresponding gas springs, as indicated by box 406. If, however, either or both of average heights RLSA and/or RRSA of the rear axles are below the corresponding target heights, then the corresponding gas springs (e.g., one or more of gas springs $GS_3$-$GS_6$) could be inflated until the target heights are met, as indicated by box 414. Conversely, if either or both of the average heights RLSA and/or RRSA are above the corresponding target heights, the corresponding gas springs (e.g., one or more of gas springs $GS_3$-$GS_6$) could be deflated until the target heights are met, as indicated by box 416.

As still another example, the actions in boxes 412-416 can be performed using the actual height values of the two gas springs operatively associated with a primary or master rear axle, such as gas springs $GS_3$ and $GS_4$ of first rear axle FRA, for example. In such case, only the height values, such as from height sensors H3 and H4, for example, of the gas springs of the master axle are compared with the corresponding rear target height. As such, the gas springs (e.g., $GS_5$ and $GS_6$) of any remaining rear axles (e.g., a second rear axle SRA) are adjusted in response to the height condition of the master axle. In one preferred embodiment, common adjustments are maintained for each of the left and right sides, such that all of the gas springs on the left side of the remaining rear axles are commonly adjusted with the left gas spring of the master rear axle, and similar adjustments are made along the right side.

Regardless of the manner in which the adjustments are made, method 400 can then return to another action (e.g., an upper level routine or program, such as method 200) once the adjustments have been completed, as indicated by box 418.

As used herein with reference to certain elements, components and/or structures (e.g., "first rear axle" and "second rear axle"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A suspension system capable of supporting an associated sprung mass on an associated unsprung mass of an associated vehicle having a longitudinally extending midline and left and right sides relative to the midline, the associated unsprung mass including a front axle, a first rear axle and a second rear axle, said suspension system comprising:

a first left gas spring and a first right gas spring respectively disposed along left-side and right-side portions of the first rear axle;

a second left gas spring and a second right gas spring respectively disposed along left-side and right-side portions of the second rear axle;

a pressurized gas system including a pressurized gas source adapted to provide pressurized gas and a control device capable of selectively placing said gas springs in fluid communication with one of said pressurized gas source and a pressurized gas exhaust;

a first set of height sensors capable of outputting signals having a relation to relative distances between the first rear axle and the associated sprung mass, said first set of height sensors including a first left height sensor operatively connected along the left-side portion of the first rear axle and a first right height sensor operatively connected along the right-side portion of the first rear axle;

a second set of height sensors capable of outputting signals having a relation to relative distances between the second rear axle and the associated sprung mass, said second set of height sensors including a second left height sensor operatively connected along the left-side portion of the second rear axle and a second right height sensor operatively connected along the right-side portion of the second rear axle; and, a controller operatively connected to said first and second sets of height sensors for receiving said signals therefrom and operatively connected to said control device for selectively inflating or deflating respective ones of said gas springs to thereby adjust a leveled orientation of the associated sprung mass, said controller storing a vertical offset threshold and an articulation offset threshold, and said controller adapted to:

determine one or more relative distances between the associated sprung mass and at least one of the first and second rear axles based on said signals from at least a corresponding one of said first and second sets of height sensors;

determine that a condition exists for adjusting said leveled orientation of the associated sprung mass based at least in part on said one or more relative distances;

calculate a first rear axle to second rear axle vertical offset (RAVO) and a first rear axle to second rear axle articulation offset (RAAO) based at least in part on said one or more relative distances;

compare said RAVO to said vertical offset threshold and compare said RAAO to said articulation offset threshold; and, upon determining that both of said RAVO and said RAAO are less than said respective vertical and articulation offset thresholds, said controller adapted to actuate said control device to selectively inflate or deflate one or more of said gas springs and thereby adjust said leveled orientation of the associated sprung mass; or, upon determining that one of said RAVO and said RAAO is one of equal to or greater than a respective one of said vertical and articulation offset thresholds, said controller adapted to one of ignore said condition for adjusting said leveled orientation of the associated sprung mass and delay adjusting said leveled orientation of the associated sprung mass until both of said RAVO and said RAAO are less than said respective vertical and articulation offset thresholds.

2. A suspension system according to claim 1, wherein said second left gas spring is fluidically connected for selective fluid communication with said first left gas spring, and said second right gas spring is fluidically connected for selective fluid communication with said first right gas spring.

3. A suspension system according to claim 1 further comprising a third set of height sensors capable of outputting signals having a relation to relative distances between the front axle and the associated sprung mass, said third set of height sensors including a third left height sensor operatively connected along the left-side portion of the front axle and a third right height sensor operatively connected along the right-side portion of the front axle, and said controller adapted to determine one or more relative distances between the associated sprung mass and the front axle based on signals from said third set of height sensors.

4. A suspension system according to claim 3 further comprising a third left gas spring and a third right gas spring respectively disposed along left-side and right-side portions of the front axle.

5. A suspension system according to claim 3, wherein the controller is further adapted to:

store a front axle to rear axle articulation offset threshold;

calculate a front axle to first rear axle articulation offset (FRAAO) based at least in part on said one or more relative distances;

compare said FRAAO to said front to rear axle articulation offset threshold; and, upon determining that said FRAAO is less than said front to rear axle articulation offset threshold, said controller adapted to adjust said leveled orientation of the associated sprung mass by actuating said control device to selectively inflate or deflate one or more of said gas springs; or, upon determining that said FRAAO is one of equal to or greater than said front to rear axle articulation offset threshold, said controller adapted to one of ignore said condition for adjusting said leveled orientation of the associated sprung mass and delay adjusting said leveled orientation of the associated sprung mass until each of said RAVO, said RAAO and said FRAAO is less than said respective vertical offset threshold, said articulation offset threshold and said front to rear axle articulation offset threshold.

6. A suspension system according to claim 5, wherein at least one of said vertical offset threshold, said articulation offset threshold and said front to rear axle articulation offset threshold is variable based at least in part on one or more of a speed of the associated vehicle, a load of the associated sprung mass, and an ambient temperature of an associated environment of the associated vehicle.

7. A suspension system according to claim 3, wherein said controller is adapted to determine that said condition exists for adjusting said leveled orientation based at least in part on said one or more relative distances between the associated sprung mass and the front axle.

8. A suspension system according to claim 7, wherein the controller is further adapted to calculate a left-side rear axle height average (LSA) and a right-side rear axle height average (RSA) based at least in part on said one or more relative distances.

9. A suspension system according to claim 8, wherein said controller is adapted to calculate said FRAAO based at least in part on said LSA and said RSA.

10. A suspension system according to claim 9, wherein the controller is further adapted to:

store a LSA target height and a RSA target height; and upon determining that each of said RAVO, said RAAO and said FRAAO is less than said respective vertical offset threshold, said articulation offset threshold and said front to rear axle articulation offset threshold, said controller adapted to actuate said control device to selectively inflate or deflate one or more of said gas springs until said LSA and said RSA approximately reach said LSA and said RSA target heights.

11. A method of operating a suspension system capable supporting a sprung mass of a vehicle on an unsprung mass thereof, the vehicle having a longitudinally-extending midline with left and right sides established relative to the midline, and the unsprung mass including a front axle, a first rear axle and a second rear axle each having left-side and right-side portions, said method comprising:
- a) providing a controller capable of controlling performance of a leveling action for adjusting a leveled orientation of the sprung mass relative to the unsprung mass, and said controller storing a vertical offset threshold and an articulation offset threshold;
- b) determining a first left height (FLH) between the sprung mass and the left-side portion of the first rear axle, a first right height (FRH) between the sprung mass and the right-side portion of the first rear axle, a second left height (SLH) between the sprung mass and the left-side portion of the second rear axle, and a second right height (SRH) between the sprung mass and the right-side portion of the second rear axle;
- c) determining based on at least one of said first left height, said first right height, said second left height and said second right height that a condition exists for initiating a leveling action to adjust the leveled orientation of the sprung mass of the vehicle;
- d) calculating at least one of a first rear axle to second rear axle vertical offset (RAVO) and first rear axle to second rear axle articulation offset (RAAO);
- e) comparing said at least one of said RAVO and said RAAO with a corresponding one of said vertical offset threshold and said articulation offset threshold; and,
- f) if at least one of said RAVO and said RAAO is equal to or greater than said corresponding one of said vertical offset threshold and said articulation offset threshold, one of:
  - f1) delaying initiation of a leveling action until each of said RAVO and said RAAO is less than said corresponding one of said vertical offset threshold and said articulation offset threshold; and,
  - f2) ignoring said condition for initiating a leveling action; or,
- g) if each of said RAVO and said RAAO is less than said corresponding one of said vertical offset threshold and said articulation offset threshold, initiating a leveling action to adjust the leveled orientation of the sprung mass of the vehicle.

12. A method according to claim 11, wherein calculating at least one of said RAVO and said RAAO in d) includes calculating said RAVO using the relation:

$$RAVO = \frac{(FLH + FRH)}{2} - \frac{(SLH + SRH)}{2}.$$

13. A method according to claim 11, wherein calculating at least one of said RAVO and said RAAO in d) includes calculating said RAAO using the relation:

$$RAAO = \frac{(FLH + SRH)}{2} - \frac{(SLH + FRH)}{2}.$$

14. A method according to claim 11, wherein b) includes determining a third left height (TLH) between the sprung mass and the left-side portion of the front axle and includes determining a third right height (TRH) between the sprung mass and the right-side portion of the front axle, and c) include determining that a condition exists for initiating a leveling action based at least in part on said third left height and said third right height.

15. A method according to claim 11, wherein providing said controller in a) includes said controller storing a front axle to rear axle articulation offset threshold value, wherein b) includes determining a third left height (TLH) between the sprung mass and the left-side portion of the front axle and includes determining a third right height (TRH) between the sprung mass and the right-side portion of the front axle, and said method further comprises:
- calculating a front axle to rear axle articulation offset (FRAAO) based at least in part on said third left height and said third right height;
- comparing said FRAAO to said front axle to rear axle articulation offset threshold value; and,
- if said FRAAO is equal to or greater than said front axle to rear axle articulation offset threshold value then performing one of f1) and f2); or,
- if said FRAAO is less than said front axle to rear axle articulation offset threshold value then performing g).

16. A method according to claim 15, wherein calculating said FRAAO includes using the relation:

$$FRAAO = \frac{(TLH + FRH)}{2} - \frac{(TRH + FLH)}{2}.$$

17. A method according to claim 15, wherein calculating FRAAO includes using the relation:

$$FRAAO = \frac{(TLH + RRSA)}{2} - \frac{(TRH + RLSA)}{2}$$

wherein a rear left-side average (RLSA) and a rear right-side average (RRSA) are respectively calculated using the following relation:

$$RLSA = \frac{(FLH + SLH)}{2}$$

$$RRSA = \frac{(FRH + SRH)}{2}.$$

18. A method of controlling a suspension system capable of supporting a sprung mass on an unsprung mass of a vehicle that has a longitudinally-extending midline with left and right sides disposed relative to the midline, the unsprung mass including a front axle, a first rear axle and a second rear axle each having left-side and right-side portions, said method comprising:
- providing a plurality of gas springs with one of said plurality of gas springs disposed along a different one of each of the left-side and right-side portions of each of the front axle, the first rear axle and the second rear axle;
- providing a plurality of height sensors with one of said plurality of height sensors operatively connected between the sprung mass and a different one of each of the left-side and right-side portions of each of the front axle, the first rear axle and the second rear axle, said plurality of height sensors being capable of outputting signals having a relation to a respective distance between the sprung mass and a respective one of said axles;

providing a pressurized gas system including a pressurized gas source adapted to provide pressurized gas and a control device capable of selectively placing said gas springs in fluid communication with one of said pressurized gas source and a pressurized gas outlet;

providing a controller in communication with said plurality of height sensors for receiving height signals therefrom, and said controller in communication with said control device for selectively inflating and deflating respective ones of said gas springs to adjust a leveled orientation of the associated sprung mass;

programming a vertical offset threshold into said controller;

determining one or more relative distances between the sprung mass and one or more of the front axle, the first rear axle and the second rear axle based on said signals from said plurality of height sensors;

determining that a condition exists for adjusting said leveled orientation of the sprung mass based at least in part on said one or more relative distances;

calculating a first rear axle to second rear axle vertical offset (RAVO) based at least in part on one or more of said relative distances;

comparing said RAVO to said vertical offset threshold; and, permitting a leveling activity upon determining that said RAVO is less than said vertical offset threshold and actuating said control device to selectively inflate or deflate one or more of said gas springs; or, prohibiting said leveling activity upon determining that said RAVO is equal to or greater than said vertical offset threshold, and one of ignoring said condition for adjusting said leveled orientation of the associated sprung mass and waiting until said RAVO is less than said vertical offset threshold before initiating said leveling activity.

19. The method of claim 18 further comprising:

programming an articulation offset threshold into said controller;

calculating a first rear axle to second rear axle articulation offset (RAAO) based at least in part on one or more of said relative distances;

comparing said RAAO to said articulation offset threshold; and, permitting said leveling activity upon determining that both of said RAVO and said RAAO are less than said respective vertical and articulation offset thresholds and actuating said control device to selectively inflate or deflate one or more of said gas springs; or, prohibiting said leveling activity upon determining that said RAAO is equal to or greater than said articulation offset threshold, and one of ignoring said condition for adjusting said leveled orientation of the associated sprung mass and waiting until said RAAO is less than said articulation offset threshold before initiating said leveling activity.

20. The method of claim 19 further comprising:

programming a front axle to rear axle articulation offset threshold into said controller;

calculating a front axle to rear axles articulation offset (FRAAO) based at least in part on one or more of said relative distances;

comparing said FRAAO to said front to rear axle articulation offset threshold; and, permitting said leveling activity upon determining that said RAVO is less than said vertical offset threshold, said RAAO is less than said articulation offset threshold and said FRAAO is less than said front to rear axle articulation offset threshold, and actuating said control device to selectively inflate or deflate one or more of said gas springs; or, prohibiting said leveling activity upon determining that said FRAAO is equal to or greater than said front to rear axle articulation offset threshold, and one of ignoring said condition for adjusting said leveled orientation of the associated sprung mass and waiting until said FRAAO is less than said articulation offset threshold before initiating said leveling activity.

* * * * *